United States Patent
Winters et al.

(10) Patent No.: US 12,443,583 B2
(45) Date of Patent: Oct. 14, 2025

(54) AUTOMATIC, REPETITIVE, AND GRADUAL SHRINK OF VERY LARGE DATABASE OBJECT STRUCTURES

(71) Applicant: Oracle International Corporation, Redwood Shores, CA (US)

(72) Inventors: Sylvia Winters, Menlo Park, CA (US); Shubha Bose, Foster City, CA (US); Teck Hua Lee, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 17/008,061

(22) Filed: Aug. 31, 2020

(65) Prior Publication Data

US 2022/0067017 A1    Mar. 3, 2022

(51) Int. Cl.
*G06F 16/23*    (2019.01)

(52) U.S. Cl.
CPC ............................... *G06F 16/23* (2019.01)

(58) Field of Classification Search
None
See application file for complete search history.

(56) References Cited

U.S. PATENT DOCUMENTS

| | | | | |
|---|---|---|---|---|
| 6,658,437 B1 * | 12/2003 | Lehman | .............. | G06F 16/2219 711/170 |
| 7,467,163 B1 * | 12/2008 | Dodds | ................. | G06F 16/2458 |
| 7,685,129 B1 * | 3/2010 | LeCrone | ............... | G06F 3/0689 707/999.01 |
| 8,443,153 B1 * | 5/2013 | Edwards | ................ | G06F 3/064 711/147 |
| 8,578,087 B2 * | 11/2013 | Acedo | ..................... | G06F 3/067 711/E12.016 |
| 9,128,825 B1 * | 9/2015 | Albrecht | ............. | G06F 12/0246 |
| 9,400,741 B1 * | 7/2016 | Bono | .................... | G06F 3/0611 |
| 2004/0054858 A1 * | 3/2004 | Chandrasekaran | ... | G06F 3/0676 707/E17.005 |

(Continued)

OTHER PUBLICATIONS

Barley, R., "Using Filestream to Store BLOBs in the NTFS File System in SQL Server 2008," dated May 1, 2008.

(Continued)

*Primary Examiner* — Kavita Stanley
*Assistant Examiner* — Cao D Vuong
(74) *Attorney, Agent, or Firm* — Vista IP Law Group, LLP

(57) ABSTRACT

A computer program product, system, and computer implemented method for automatic, repetitive, and gradual shrink of very large database object structures. The approach disclosed herein generally comprises an iterative best efforts approach to automatically shrink a large database object structure(s). The process may comprise identifying a large object (LOB) structure shrink event and LOB structure or LOB structure segment to be shrunk. And executing a shrink operation on the LOB structure or LOB structure segment without blocking access to other extents in the LOB structure or LOB segment structure. This process allows an extent to be shrunk and deallocated. As a result, the process can operate to continually clean a LOB structure or LOB structure segment to decrease fragmentation within the extents of the LOB structure or LOB segment structure.

21 Claims, 16 Drawing Sheets

(56) References Cited

U.S. PATENT DOCUMENTS

| | | | | |
|---|---|---|---|---|
| 2012/0233134 | A1* | 9/2012 | Barton | G06F 16/162 |
| | | | | 707/692 |
| 2013/0054545 | A1* | 2/2013 | Anglin | G06F 3/0673 |
| | | | | 707/693 |
| 2014/0279963 | A1* | 9/2014 | Schreter | G06F 16/23 |
| | | | | 707/693 |
| 2014/0280249 | A1* | 9/2014 | Marwah | G06F 16/2219 |
| | | | | 707/754 |
| 2015/0019509 | A1* | 1/2015 | Aronovich | G06F 3/067 |
| | | | | 707/692 |
| 2015/0100606 | A1* | 4/2015 | Bonner | G06F 16/2282 |
| | | | | 707/803 |
| 2015/0370505 | A1* | 12/2015 | Shuma | G06F 3/0604 |
| | | | | 711/165 |
| 2016/0070819 | A1* | 3/2016 | Söderberg | G06F 16/211 |
| | | | | 707/694 |
| 2017/0242882 | A1* | 8/2017 | Watkins | G06F 16/23 |
| 2018/0074735 | A1* | 3/2018 | Lee | G06F 16/122 |
| 2018/0373893 | A1* | 12/2018 | Benker | G06F 16/164 |
| 2019/0026309 | A1* | 1/2019 | Roy | G06F 16/162 |
| 2020/0250134 | A1* | 8/2020 | Hu | G06F 16/128 |
| 2020/0341677 | A1* | 10/2020 | Shao | G06F 3/0653 |

OTHER PUBLICATIONS

Gupta, R., "Filestream in SQL Server," SQLShack, dated Jan. 11, 2019.

Lalani, A., "How to Remove Filestream from a SQL Server Database," dated Feb. 13, 2019.

Shinoda, N., "PostgreSQL 12 New Features With Examples (GA)," Hewlett Packard Enterprise, dated Oct. 7, 2019.

"Vacuumlo—removing large objects orphans from a database PostgreSQL," TutorialDBA, dated Apr. 23, 2018.

"Can I do Vacuum Full to pg_largeobject table?," StackExchange, dated Aug. 29, 2015, URL: https://dba.stackexchange.com/questions/112637/can-i-do-vacuum-full-to-pg-largeobject-table.

"F.46. vacuumlo," PostgreSQL, date found via Internet Archive as Sep. 27, 2020, URL: https://www.postgresql.org/docs/9.1/vacuumlo.html.

"Chapter 35. Large Objects," PostgreSQL, date found via Internet Archive as Sep. 30, 2021, URL: https://www.postgresql.org/docs/current/largeobjects.html.

Britton, G., "Shrinking your database using DBCC Shrinkfile," SQLShack, dated Aug. 16, 2018.

* cited by examiner

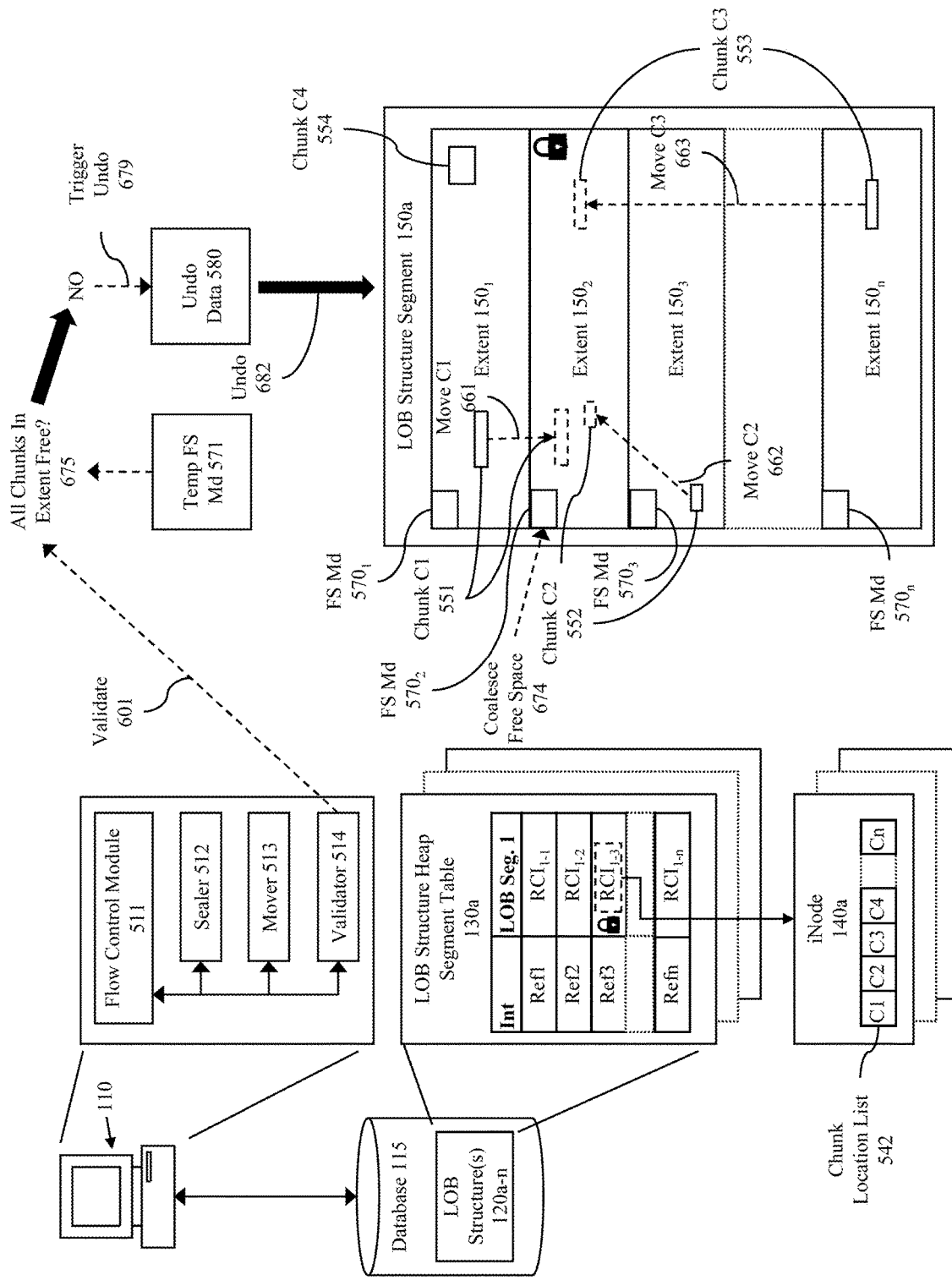
FIG. 6B1

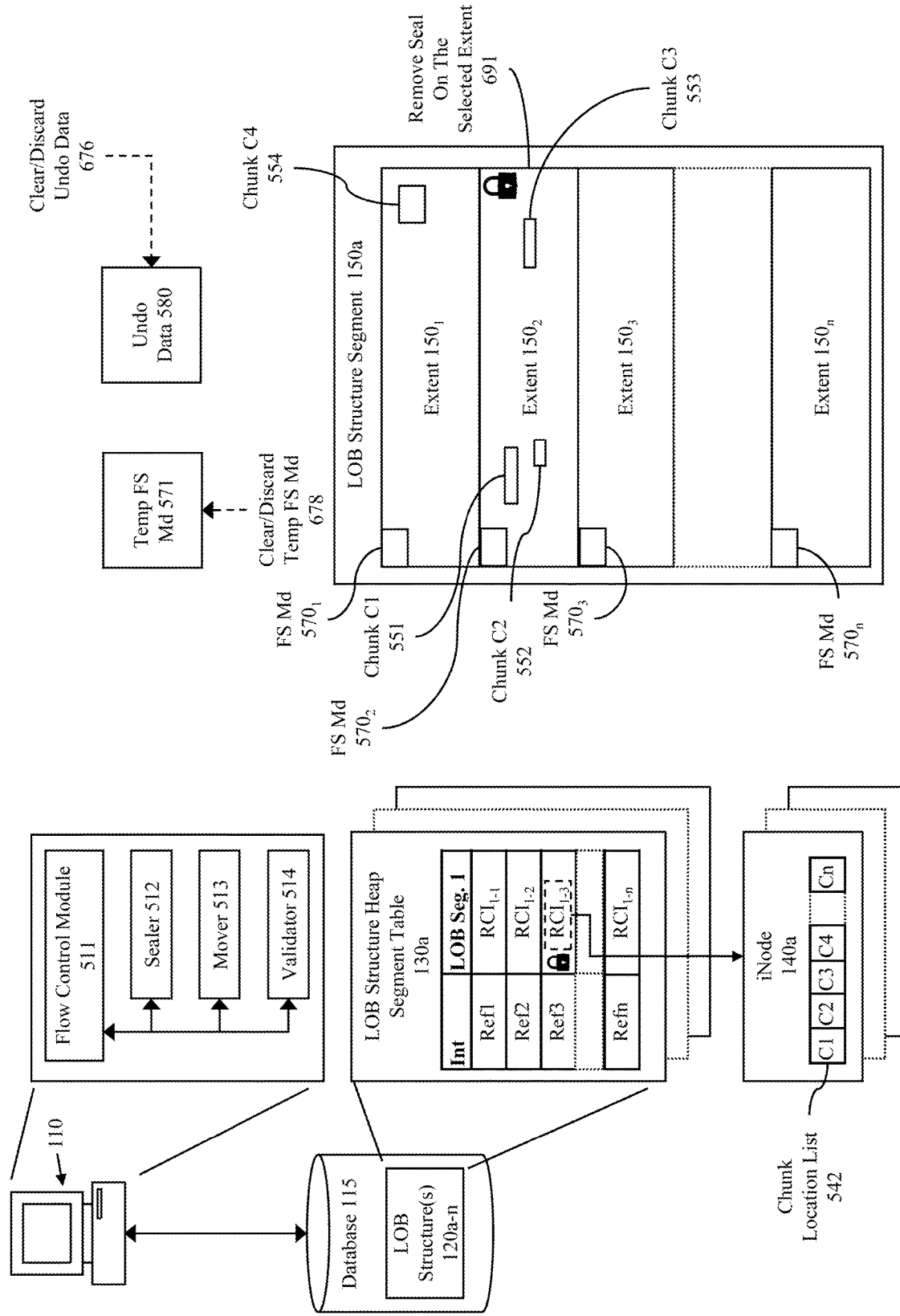
FIG. 6B2

AUTOMATIC, REPETITIVE, AND GRADUAL SHRINK OF VERY LARGE DATABASE OBJECT STRUCTURES

BACKGROUND

The types of data managed by computing systems can vary widely. In the context of unstructured (e.g., video/audio files) and semi-structured (e.g., XML) data one approach in the network context is to use a large object (LOB) structure at the database level. This LOB structure is then used for data storage functions including reading, writing, overwriting, and deleting data
also known by the acronym CRUD (create, read, update, delete).

However, as the LOB structure is used to store data, the data within the LOB structure will become fragmented. In order to address this, prior approaches copy data from the fragmented LOB structure to a newly allocated LOB structure to create a defragmented version of the old fragmented LOB structure. This has multiple problems: the data in the fragmented LOB structure and the data (LOBs) in the defragmented LOB structure are not accessible during the copy operation and both the old fragmented LOB structure and the new defragment LOB structure are both fully allocated at the same time, requiring two times the amount of space used by the fragmented LOB structure. Unfortunately, these LOB structures can be quite large, in the order of petabytes or larger. As a result, the allocation requirements, and the time to copy the data to the new LOB structure are both prohibitively large. This creates unwanted downtime and requires additional storage capacity that might not otherwise be required. Specifically, these approaches will often take many hours if not days to complete will block write operations to the LOB in the LOB structures while they are in progress.

Therefore, there is a need for an improved approach to manage LOB structures that does not suffer from the same drawbacks as prior approaches.

SUMMARY

Embodiments of the present disclosure provide a method, apparatus, and product for automatic, repetitive, and gradual shrink of very large database object structures.

The approach disclosed herein generally comprises an iterative best efforts approach to automatically shrink space for large database objects such as embodied in a large object (LOB) structure. The process may comprise identifying at least a portion of a large object (LOB) structure to shrink the LOB structure or segment thereof and executing a shrink operation on the portion of the LOB structure without blocking access to other portions of the LOB structure. In some embodiments, the portion of the LOB structure comprises one or more extents used by the LOB structure to store data in chunk(s) that makeup one or more corresponding LOB structure(s). When successful, this process allows the portion of the LOB structure to be deallocated. Subsequently, another portion of the LOB structure can be selected and processed similarly. As a result, the approach can operate to continually cleanup a fragmented LOB structure, possibly on a segment by segment basis, to decrease fragmentation within the extents of the LOB structure or LOB structure segment.

Further details of aspects, objects and advantages of the disclosure are described below in the detailed description, drawings, and claims. Both the foregoing general description and the following detailed description are exemplary and explanatory and are not intended to be limiting as to the scope of the disclosure.

BRIEF DESCRIPTION OF THE DRAWINGS

The drawings illustrate the design and utility of embodiments of the present disclosure, in which similar elements are referred to by common reference numerals. In order to better appreciate the advantages and objects of embodiments of the disclosure, reference should be made to the accompanying drawings. However, the drawings depict only certain embodiments of the disclosure, and should not be taken as limiting the scope of the disclosure. The drawings use like reference numerals to identify like elements, and unless otherwise specified, any description for that element may be applicable to each use of that reference numeral were appropriate.

FIGS. 6A-6B2 illustrate an example flow for titled validate or fail gracefully according to some embodiments.

DETAILED DESCRIPTION OF THE EMBODIMENTS OF THE DISCLOSURE

Various embodiments are described hereinafter with reference to the figures. It should be noted that the figures are not necessarily drawn to scale. It should also be noted that the figures are only intended to facilitate the description of the embodiment(s) and are not intended as an exhaustive description of the disclosure or as a limitation on the scope of the disclosure. In addition, an illustrated embodiment need not have all the aspects or advantages shown. An aspect or an advantage described in conjunction with a particular embodiment is not necessarily limited to that embodiment and can be practiced in any other embodiments even if not so illustrated.

Figure 1A:
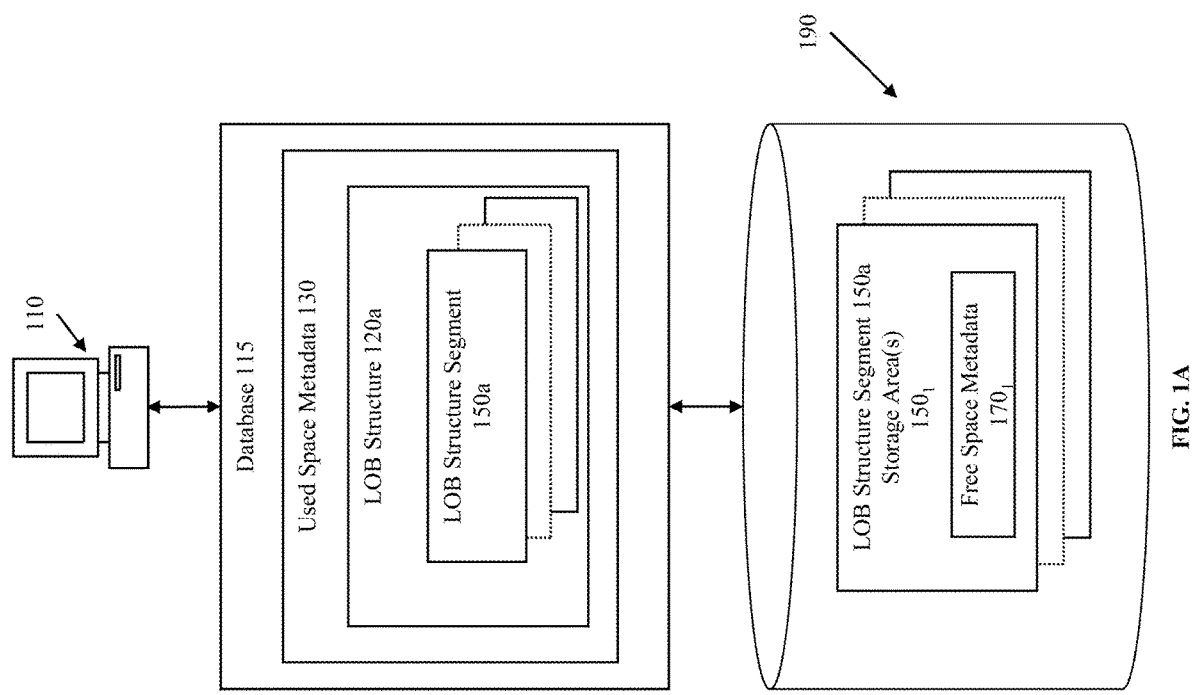
FIG. 1A illustrates a system in which some embodiments of the disclosure are implemented.

FIG. 1A illustrates a system in which some embodiments of the disclosure are implemented. Generally, the system includes a database level and a storage level. The system may be provided by a single device or multiple different devices such as computing devices, storage appliances or any combination thereof which may be access by one or more computing devices.

The system includes a computing device 110, a database 115, and storage 190. The computing device 110 interacts with the LOB structure via the database 115, and in some embodiments perform actions to manage the LOB structure to move data in chunks (contiguous set of blocks that store related data) between portions of the LOB structure and automatically, repetitively, and gradually shrink very large database object structures. The database and underlying LOB structure can be accessed by any number of computing devices on a network and can even be managed by multiple concurrent processes operating on the same or different computing devices as will be discussed further below. Throughout this document the data in chunks are referred to simply as a chunk(s) for simplicity. However, strictly speaking a chunk is a portion of a storage device (e.g., a portion within an extend) that is at a physical location and stores data. Thus, in the context of creating, reading, updating, deleting, and/or moving a chunk the actual operation is on the data within the chunk.

Computing device 110 comprises any type of computing device that may be used to operate or interface with the large object in the database, whether directly or indirectly. Examples of such user computing devices 110 include, for example, workstations, personal computers, laptop computers or remote computing terminals. User computing devices 110 may also comprise any type of portable tablet device, including for example, tablet computers, portable readers, etc. User computing device 110 may also include mobile telephone devices relating to any mobile device that can suitably access any computing systems, as an example, on the Internet such as smartphones and programmable mobile handsets. It is noted that the disclosure is not limited in its application to just these types of devices. The embodiments of the disclosure are applicable to any computing device that works in conjunction with access to digital information stored on, as an example, the Internet. One of ordinary skill in the art may appreciate embodiments of this present disclosure may be implemented on the Internet, on a closed network, on a hybrid open and closed network, or on a cloud network, etc.

Database 115 includes data for managing the LOB structure and data therein. In particular, the database 115 includes used space metadata 130 that specifies the location of data in the LOB structure (e.g. LOB structure 120*a*) and the LOB structure is divided into a number of segments such as LOB structure segment 150*a*.

However, whereas the database level (data layer) identifies where data is stored for the LOB structure and/or LOB structure segment(s) thereof, the underlying storage 190 (space layer) identifies where the unused portions of storage within the LOB structure are located (see e.g. free space metadata 170). Details of this is discussed further in the subsequent figures. Briefly, each LOB structure segment (e.g., 150$_a$) comprises some number of storage areas (e.g. 150$_1$) that include the free space metadata (e.g. free space metadata 170$_1$).

Figure 1B:
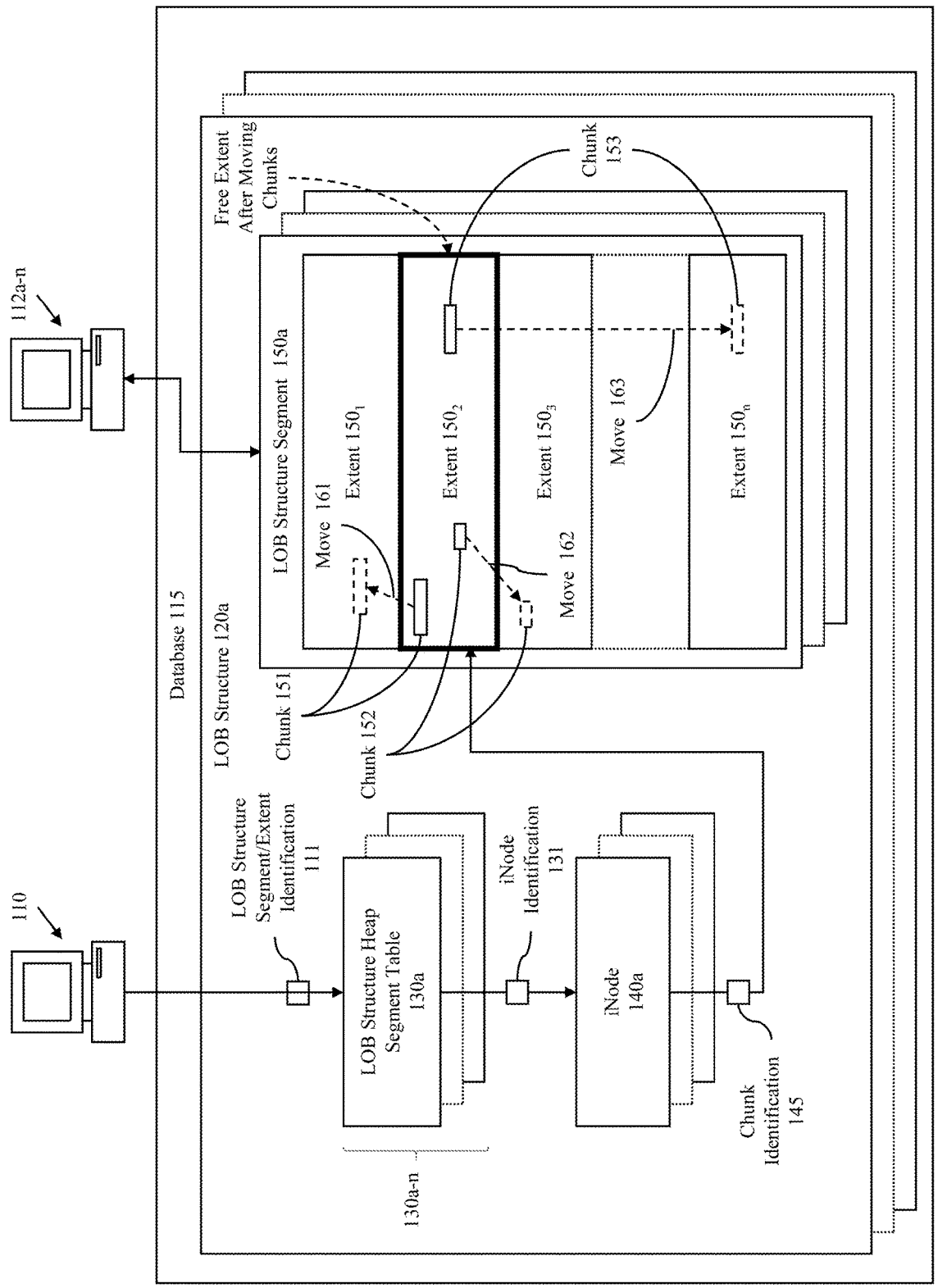
FIG. 1B illustrates an arrangement of a LOB according to some embodiments.

FIG. 1B illustrates an arrangement of a LOB structure according to some embodiments. Generally, this comprises multiple layers of data at the database level that are used to point to the actual stored data at the storage level. The LOB structure may be accessed by multiple computing devices 112*a-n* which may be equivalent to computing device 110. However, the full logical path is only illustrated for computing device 110. For example, while computing device 110 could comprise a single computing device, additional devices (e.g. 112*a-n*) could implement the same processes as computing device 110 in parallel or at different times.

As illustrated, the database 115 may contain one or more LOB structures (e.g. LOB structure 120*a*) having and/or being represented by a multi-level table arrangement. For instance, LOB structure 120*a* might be represented by one or more LOB structure heap segment tables 130*a-n*. Each heap table includes a plurality of entries that map requested data (e.g., a LOB instance) to an iNode. The iNodes identify a chunk within a particular storage area associated with a LOB instance, where the iNode(s) are identified by the row-column intersection. The storage areas as illustrated herein comprise extents. However, other abstractions could be utilized with the approach described in the present document. Once identified, a chunk can be read, updated, or deleted. Additionally, each LOB structure can be divided into any number of LOB structure segments, which are internally constructed from a plurality of extents on a storage device (e.g. storage 190) and are represented by different partitions on one or more heap tables (e.g. as different columns). In some embodiments, each heap table has multiple columns and multiple rows. One those columns might correspond to a LOB type. Generally, each row-column intersection with the LOB type column corresponds to an iNode that comprises a map of all chunks allocated to store the data for a particular LOB identified using that particular row-column intersection.

In the context of the present disclosure, a process might identify data within an extent—e.g. by traversing a LOB structure segment, possibly using an extent identification 111, which can in turn be used to identify data within a particular extent. In particular, a row-column intersection in a heap table of a heap table maps to an iNode identification (see 131) which can be used at an iNode 140*a* to determine the storage location for a chunk (e.g. chunk identification 145) which may corresponding to an extent that is currently being operated on. This information can then be used to read, updated, or deleted, or as disclosed herein, to move a corresponding chunk(s) in an extent into another extent so that the current extent can be freed. For example, if extent 150$_2$ is the selected extent, and that extent includes three chunks 151-153. These chunks can then be moved into different extents. For example, chunk 151 can be moved at 161 to extent 150$_1$, chunk 152 can be moved at 162 to extent 150$_3$, chunk 153 can be moved at 163 to extent 150$_n$. Once all the chunks are moved out of the extent 150$_2$, the extent 150$_2$ can be freed. More details regarding the disclosed approach are provided below.

Figure 2:
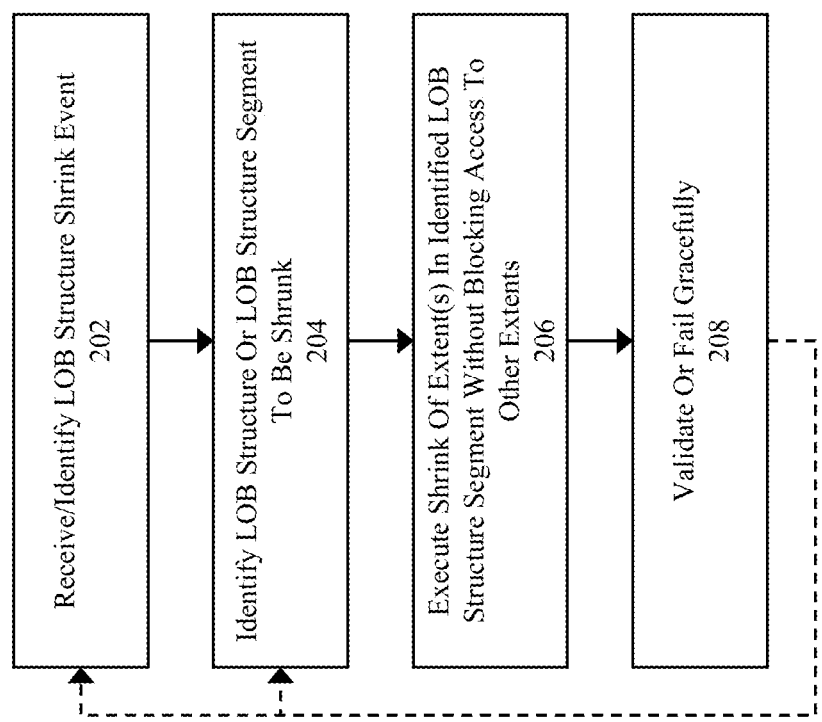
FIG. 2 is a flowchart for automatic, repetitive, and gradual shrink of very large database object structures according to some embodiments.

FIG. 2 is a flowchart for automatic, repetitive, and gradual shrink of very large database object structures according to some embodiments. Generally, the process starts with a triggering event which is associated with a LOB structure or LOB structure segment to be shrunk using a best efforts approach. The shrink operation is then executed with limited blocking and a validation process which provides a graceful failure process.

The process starts at 202 where a LOB structure shrink event is received and/or identified. For example, any number of thresholds could be applied to trigger shrinking such as based on time (e.g. a periodic operation), based on number of creations/reads/updates/deletes, based on a ratio of used to available storage, or any other relevant parameter. In some embodiments, the completion of processing of an extent to be freed can be used to trigger one or more shrink events. The events might be associated with a list, table or other set of data representing extents to be shrunk. For example, an identification of all extents within a LOB structure or LOB structure segment, an identification of all extents within a LOB structure or LOB structure segment that meet a minimum amount/ratio of free space, an identification of all extents within a LOB structure or LOB structure segment that meet a minimum time since a last shrink attempt, an identification at random, or any combination thereof.

Once an event is triggered, at 204, one or more extents within the LOB structure and/or LOB structure segment are selected for shrinking. In some embodiments, each computing device will only execute a shrink process for a single extent at a time. In some embodiments, each computing device issues multiple shrink processes to process multiple extents in parallel at any time. In some embodiments multiple computing devices execute one or more shrink processes at the same time. For example, in a distributed arrangement, a central management agent generates a list of shrink jobs each identifying an extent to be shrunk, and each computing device can be assigned and execute one or more shrink jobs at any given time. In some embodiments, multiple computing devices can independently execute the disclosed process to perform shrink operations on a selected extent(s). In some embodiments, the number of shrink operations executed is dependent at least in part upon whether a prior shrink operation is successful. For instance, if three failed shrink operations are identified in a threshold number of shrink operations the process may be halted until a new shrink event is received/identified at 202. Additionally, the number of shrink operations to be issued at any given time might be increased with a number (e.g. 1 or more) of successful shrink operations. In one scenario, if a shrink operation is successful then an increased number of shrink operations are executed (e.g. incremented or a multiple of the prior number of jobs executed), and if a shrink operation is unsuccessful then the number of operations executed are decreased in a similar fashion. Finally, if a threshold number of jobs have a threshold number of failures the process may be halted all together until a new shrink event is received at 202.

At 206 one or more extent shrink operations are executed on an extent by extent basis that does not block access to extents within the LOB structure that are not currently being shrunk. For example, one extent might be selected and sealed in an attempt to disallow allocation within the extent and to disallow writing to chunks already present in the extent. Generally, the LOB instance is accessible by multiple computing devices. The sealing operation is implemented to stop the current computing device and the other computing devices from storing data within the extent or updating/modifying data that is already in that extent. In some embodiments, this process is a best effort process in the sense that sealing an extent is done by sending a message to each computing device that has access to the extent (e.g. computing devices 112*a-n*) that specifies that the extent should not be used to allocate storage space for new chunks and that the data already in the extent should not be modified, but the process does not wait for a confirmation/acceptance message from the computing devices that have access to the extent. This is because waiting for responses from each computing device would significantly slow the approach disclosed herein and because of the additional communications required and potential issues with timeout of these communications with large numbers of devices that can access the LOB structure. Additionally, it is difficult to ensure that all device having access to a selected extent have not crashed or disconnected at an unfortunate time. The sealing of the extent is thus intended to block allocation of new chunks in any extent that is being shrunk and modification of data therein. However, this may be unsuccessful if the message to the computing devices is not received and complied with. Regardless we refer to this message and the state created by it as sealing and sealed, respectively. As will be discussed further below verification is performed before the extent is finally deleted because the message may not always be received and complied with by each relevant device.

At 208, a validation process is implemented that includes a graceful failure process. As indicated above in regard to 206, data can be written to an extent while that extent is in the processes of being shrunk—this is at least in part because this is a best efforts approach. If this happens and the new allocation was not moved out of the extent to a new location, there should be a failure response to address the issue without data loss. Here the graceful failure process accounts for such a scenario. On the other hand, if all chunks have been successfully moved out of the extent to some other extent, and all space in the extent is free, then the process should validate the shrink and formally unallocated/deallocate the extent to remove it from the LOB structure segment.

Figure 3:
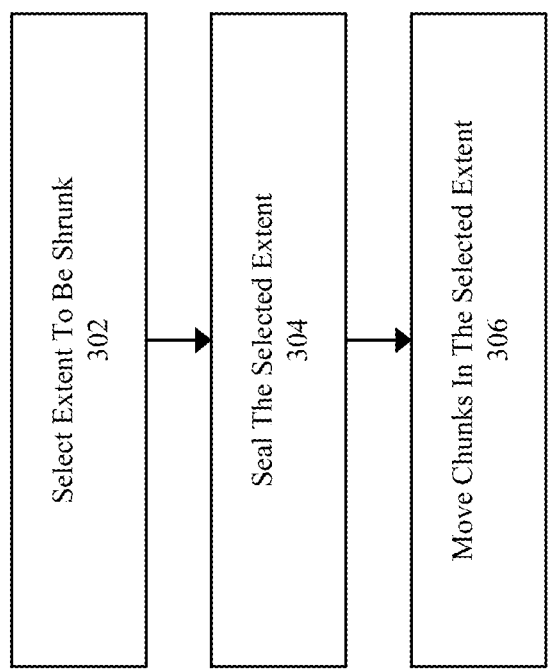
FIG. 3 is a more detailed flowchart for the execute shrink of extent(s) in identified LOB structure segment without blocking access to other extents according to some embodiments.

FIG. 3 is a more detailed flowchart for execute shrink of extent(s) in identified LOB structure or LOB structure segment without blocking access to other extents at 206 of FIG. 2 according to some embodiments. Generally, the approach includes selecting an extent to be shrunk, sealing that selected extent, and moving chunks in the selected extent into other extents within the LOB structure or the LOB structure segment.

At 302 an extent within a LOB structure segment is selected. For instance, the extent is selected based on the last extent that was shrunk, based on a previously selected extent, based on a position within a list, table, or address space, based on a fragmentation level, or based on information received at 202. The selected extent is then sealed at 304 to prevent allocation of space from the extent. For example, a message is transmitted to each computing device specifying that the selected extent is sealed. In some embodiments, multiple extents may be sealed at any given time such as for each of one or a plurality of automatic, repetitive, and gradual shrink of very large database object processes at one or more computing devices.

Once sealed at 304, the actual chunks of data in the extent are moved to other extents at 306. As will be illustrated below, this movement process may capture additional data that is used in the validation and/or graceful failure process such as data to undo moves and data to restore the representation of the original free space metadata but for any newly allocated chunks. As will be illustrated below, when chunks within the selected extent are identified, the heap table is traversed by identifying row and column intersections (RCI) in a corresponding heap table which are processed by locking each respective row-column intersection (RCI) while the chunk(s) referenced by the RCI are processed to relocate those chunks. In some embodiments, each RCI is maintained/accessed at/from a single location where the lock is granted by a database processor on the process operating on the RCI.

Figure 4:
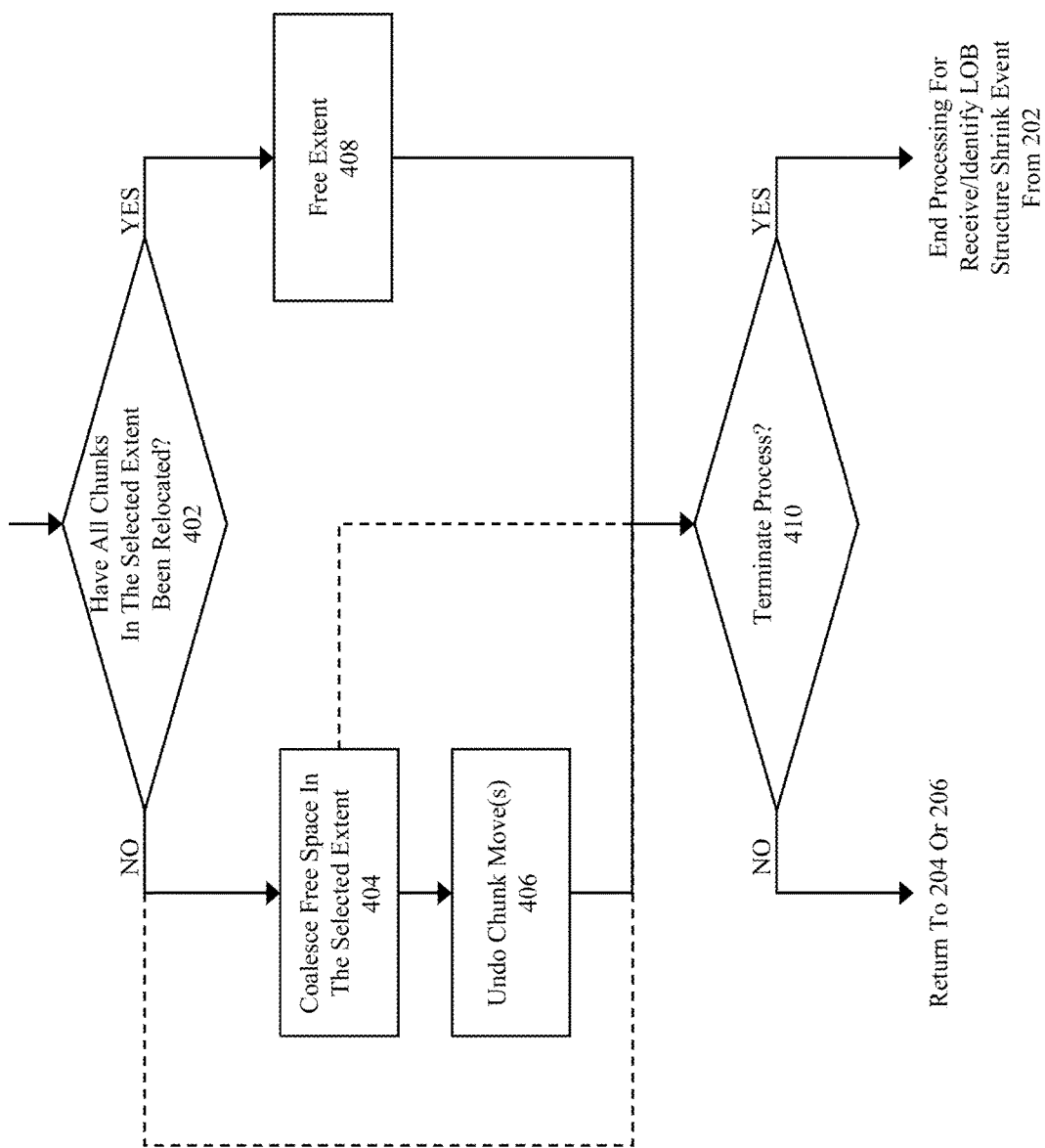
FIG. 4 is a more detailed flowchart for an action to validate or fail gracefully according to some embodiments.

FIG. 4 is a more detailed flowchart for the validate or fail gracefully block at 208 of FIG. 2 according to some embodiments. Generally, the process implements multiple different ways to handle a processed extent based on at least the success or failure of the previous operations to move all data from the processed extent. In a first approach, the extent is freed in response to a successful validation. In a second approach, the extent is not freed. However, there are various different permutations for the second approach. These permutations may include any combination of ending the validation process without freeing the extent, coalescing the free space metadata in/for the selected extent, and/or undoing chunk move(s).

The process starts at 402 where a determination is made as to whether all chunks in an extent have been relocated. As will be explained in the illustration below (see FIG. 6A-6B2) the process may be executed by verifying that a working set of free space metadata accounts for the entire amount of space in the extent. If some space is unaccounted for, then it is likely that another computing device with access to the extent has written new data in the extent that was not relocated, or the process has failed for some other reason. However, if all the space in the extent has been accounted for, the process proceeds at 408 to free the extent and in some embodiments to discard any undo data that is no longer needed. Otherwise, the process proceeds at 406 and, in some embodiments, after proceeding through 404.

At 406, the relocations of the chunks are undone such that the chunks are returned to their previous location. An illustrative example of one approach to manage the creation of data to manage this process and how the undoing is performed is discussed further below. In some embodiments, the free space metadata may be coalesced into a more compact form at 404. For instance, different entries for segments of free space that are contiguous may be combined into a single entry that represents that same free space in fewer entries. Free space might be identified by a range of addresses (e.g. starting and ending addresses) or by a starting/ending address and a length. Additionally, in some embodiments, when only some of the chunks have been relocated as determined at 402, those relocated chunks may be left in their new locations. Furthermore, in some embodiments, the approach that leaves chunks that have been relocated in their new location can be combined with coalescing the free space that their movement created with any already existing free space in a condensed representation. In some embodiments, the coalescing may also include moving the relevant data to a different location of the within the extent. For example, the data from each chunk might be moved to a contiguous set of chunks at some location within the extent (e.g., the beginning of the data storage area in the extent).

At 410 a determination is made as to whether the process should terminate or should continue. If the determination is to terminate the process as discussed elsewhere, the process stops selecting additional extents within the LOB structure or LOB structure segment and the process returns to 202 whenever a next triggering event occurs. However, if the determination is to continue the process, the flow will return to 204 or 206 as appropriate. In some embodiments, the determination on whether to terminate the process is integrated with the processes of block 204 and applies the logic as discussed above.

FIGS. 5A-5F illustrate an example flow for execute shrink of extent(s) in identified LOB structure segment without blocking access to other extents at 206 of FIG. 2 according to some embodiments.

Figure 5A:
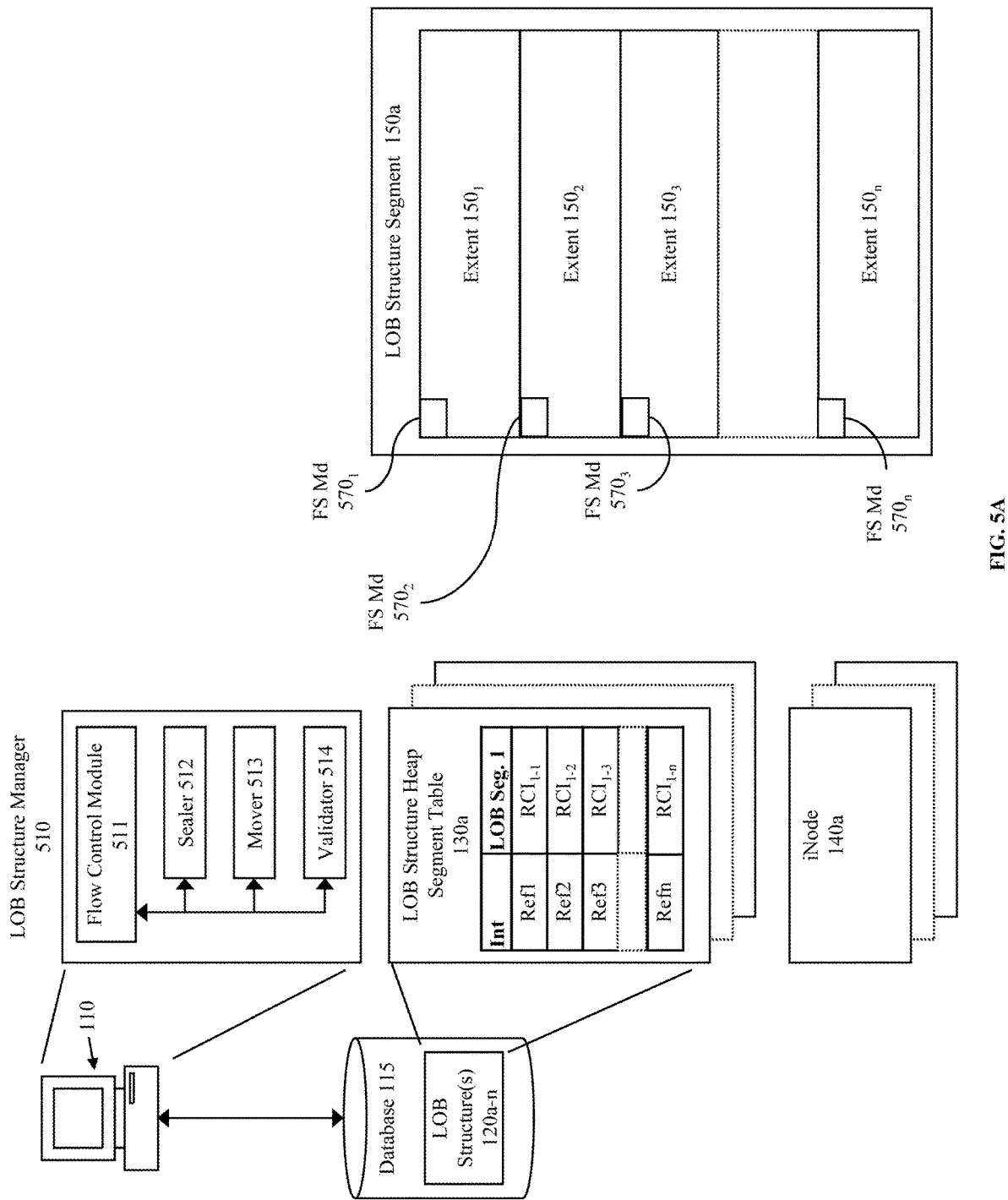
FIGS. 5A-5F illustrate an example flow for titled execute shrink of extent(s) in identified LOB structure segment without blocking access to other extents according to some embodiments.

FIG. 5A illustrates an initial state of a LOB heap segment table and a LOB structure segment of a LOB structure.

Computing device 110 as illustrated includes a LOB Manager 510. The LOB manager 510 is a process to manage the automatic, repetitive, and gradual shrink of very large database object structures. The LOB manager 510 includes a flow control module 511 which is connected to a sealer 512, a mover 513, and a validator 514. The function of these elements will be discussed further below as we discuss the illustrations in FIGS. 5A-5F. Briefly, the flow control module 511 will control the flow of actions for the selection, sealing, moving, and validating the shrink of extents.

The computing device 110 interfaces with the database 115 and the LOB(s) 120*a-n* via a respective LOB heap segment table (see e.g. 130*a*). For example, each segment of a LOB structure might be represented in a single heap segment table, or with different heap segment tables representing different segments of the LOB structure. In some embodiments, different LOB segments for the same LOB structure may be represented in a single heap segment table. In some embodiments, a respective heap segment table might represent multiple segments of a single LOB structure, a single segment for multiple LOB structures, or multiple segments for multiple LOB structures. As discussed above, the different entries in the heap segment table 130*a* might reference one or more iNodes 140*a* which in turn reference chunks within a corresponding LOB structure segment 150*a* and a corresponding extent.

The LOB structure segment 150*a* comprises some number of storage areas $150_{1-n}$. Each extent includes a corresponding set of metadata (see FS Md $570_{1-n}$) specifying the free space within the storage area (e.g. extent or extents). Additionally, each storage area includes chunks that are identifiable via the LOB heap segment table 130*a* in combination with corresponding iNodes 140*a*.

Figure 5B:
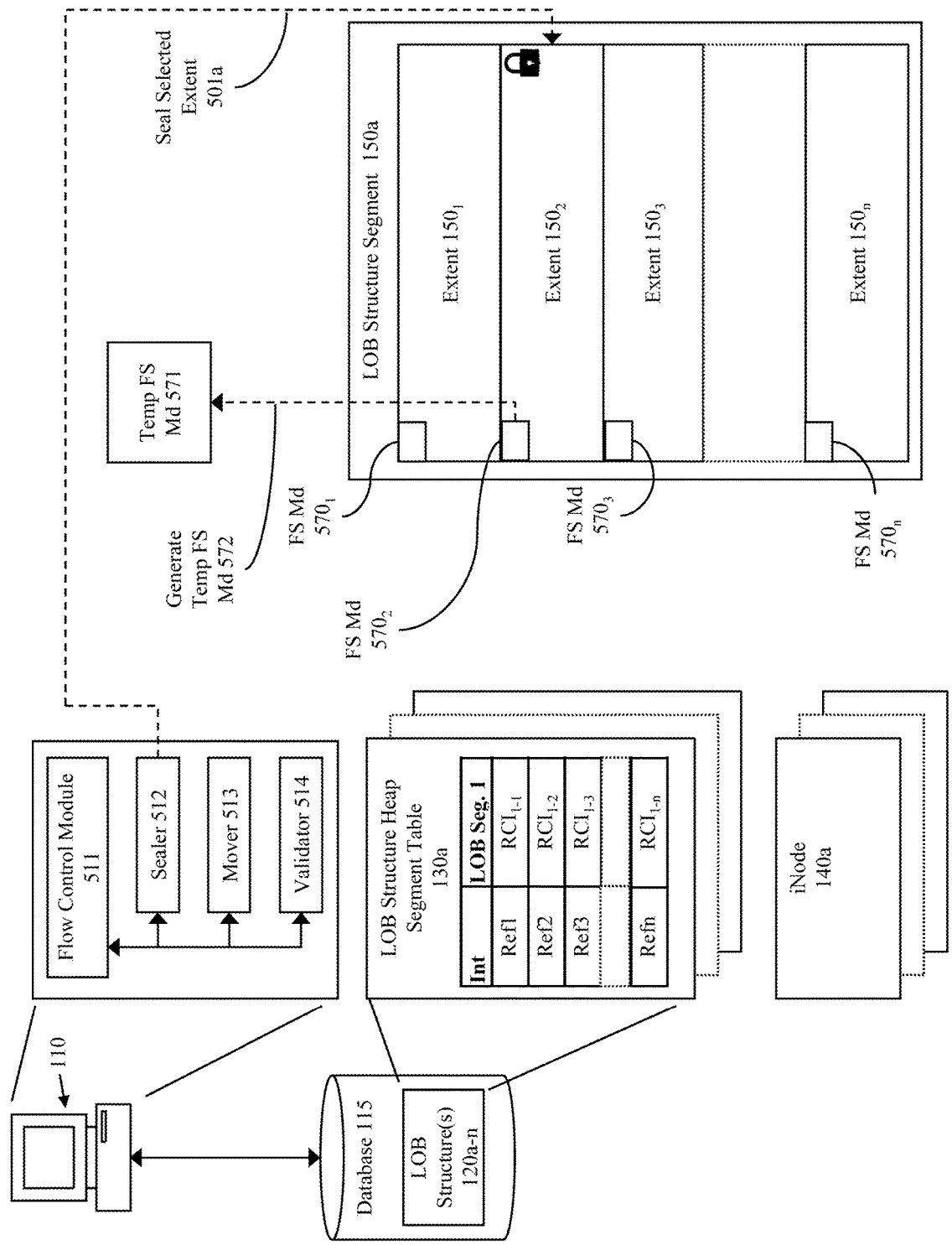

FIG. 5B illustrates sealing of a selected extent as controlled by the flow control module 511. Generally, this is implemented using the flow control module 511 and the sealer 512.

For example, the flow control module 511 sends a command to the sealer 512 to seal a selected extent. Here, the selected extent is $150_2$ and the sealing of the selected extent at 501*a* is illustrated by the lock symbol in the extent $150_2$. The sealing of the extent might be accomplished by transmitting a message indicating that the specified extent is sealed to each device that is allowed to access that particular extent (e.g. as determined based on the LOB structure or LOB Segment structure metadata). In some embodiments, not all of the sealing messages may reach its target or be complied with by its targets.

Additionally, the flow control module 511 triggers the creation of a temporary set of free space metadata 571 that reproduces free space metadata $570_2$. As will be discussed below, the temporary copy of the metadata allows for verification that all chunks within the extent have been relocated and for coalescing the free space representation when all chunks have not been relocated, without destroying the previous free space representation. In some embodiments, the flow control module uses the validator 514 to trigger the creation of this replica of the free space metadata.

Figure 5C:
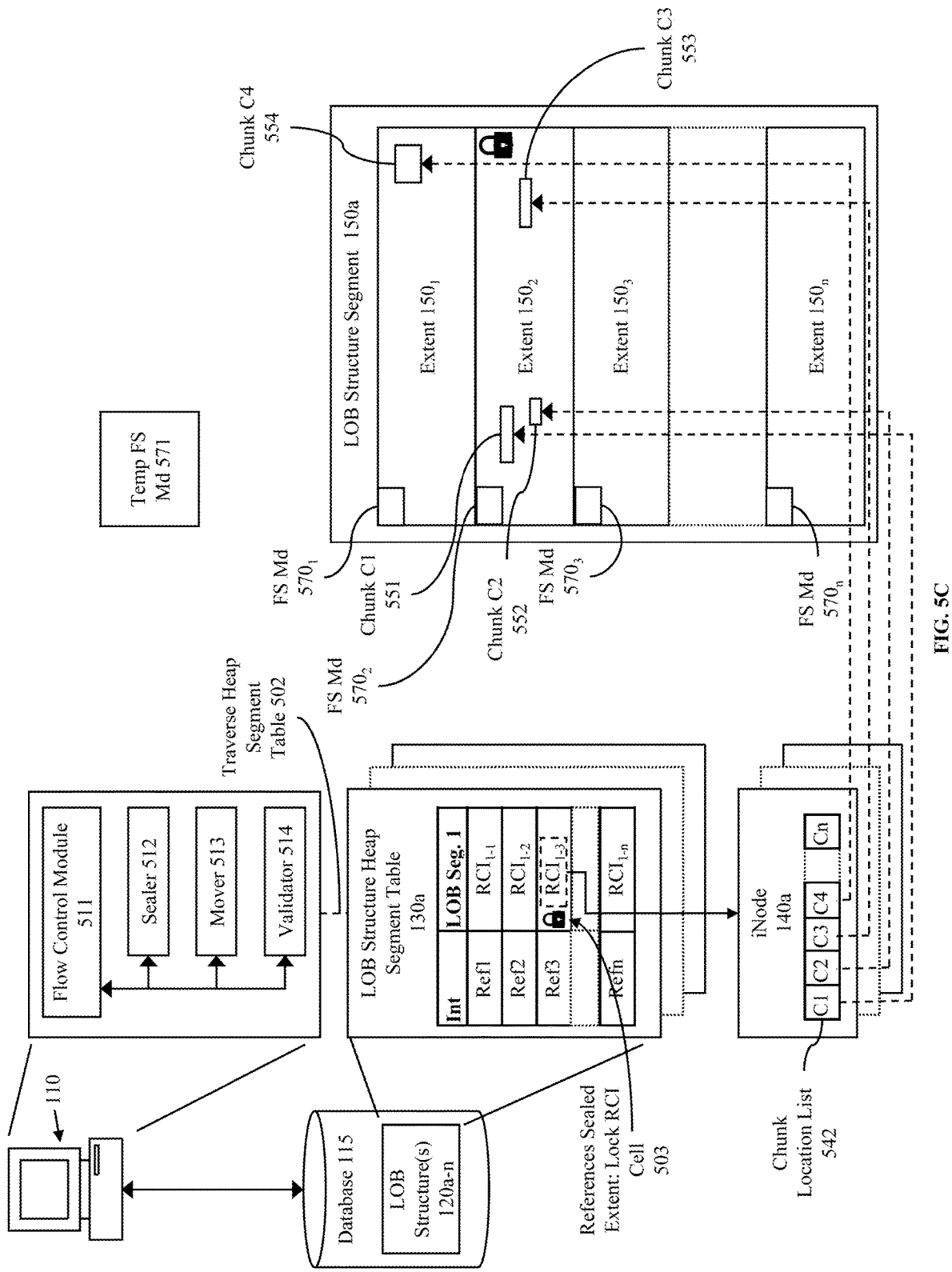

FIG. 5C illustrates the identification and sealing of a row column intersection that references an iNode that in turn identifies chunks within the selected extent.

For example, the flow control module 511 might traverse the LOB Heap Segment Table 130*a* to identify a/any cell that has an address range corresponding to the selected extent at 502. When a cell is identified, a lock is applied to the row and column intersection (RCI) of that cell to stop other devices from modifying the RCI while that cell is being processed. In some embodiments, there are multiple different RCIs that each reference the selected extent that must be processed to free the extent. The RCIs that correspond to the Extent may be identified based on an address or range of addresses that overlap/reference the selected extent. Regardless, the RCI that references the selected extent is locked at 503.

Once the RCI is identified, it can be used to locate one or more corresponding iNodes—e.g. 140a. The iNode includes a list of chunks within the extent and the corresponding location of those chunks. INodes generally include information (e.g. metadata) identifying a location(s) of the corresponding data—e.g. metadata that identifies the location of a chunk(s) that make up a file by identifying one or more offsets and corresponding sizes for each offset. In this way the iNode can identify the location of chunks within an extent.

As illustrated, the iNode 140a includes a chunk location list 542 that specifies the location of chunks C1-Cn where C1-C3 are located in the selected extent and where C4 is located in a different extent (see chunk C1 551, C2 552, C3 553, and C4 554).

Figure 5D:
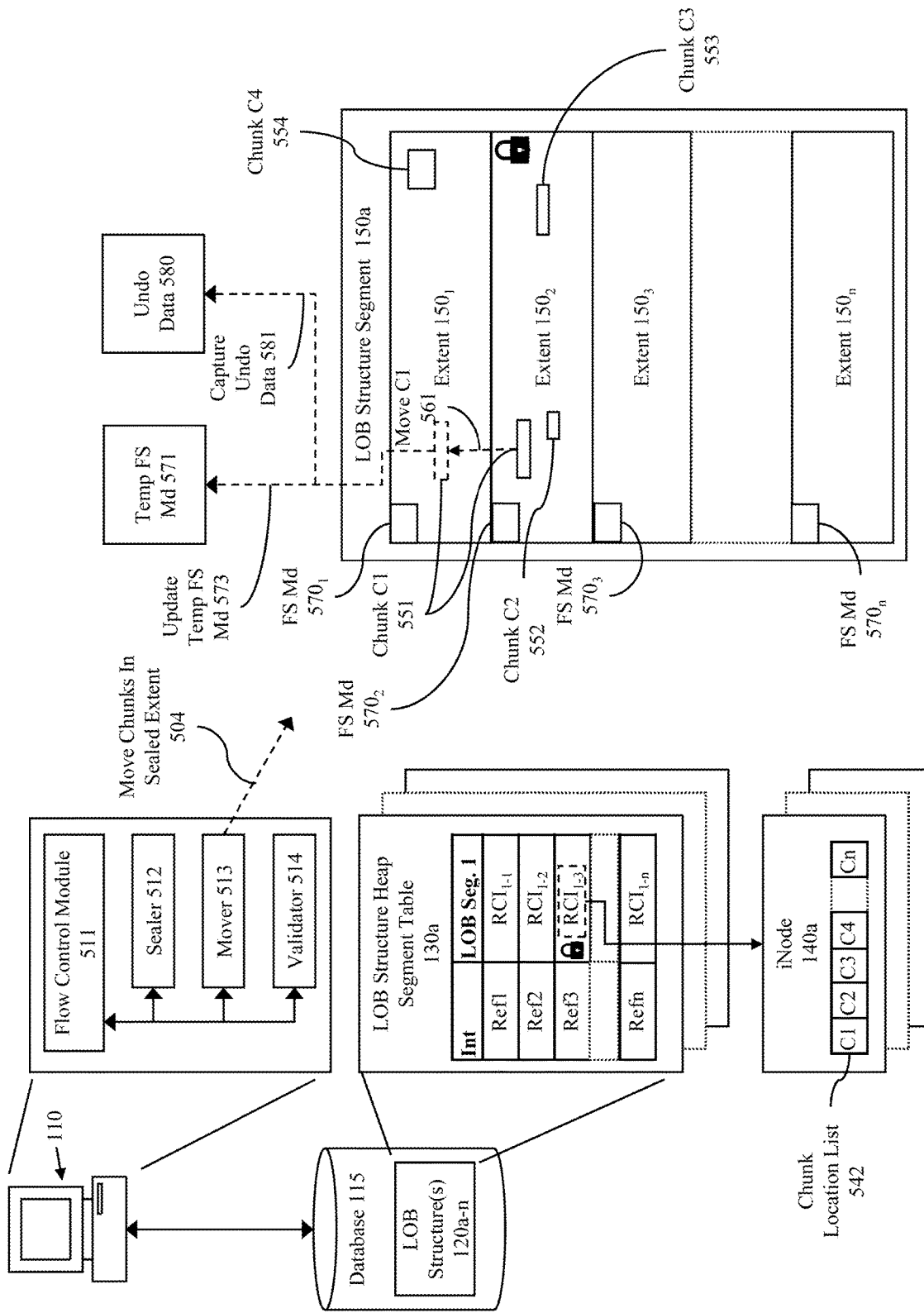
Figure 5E:
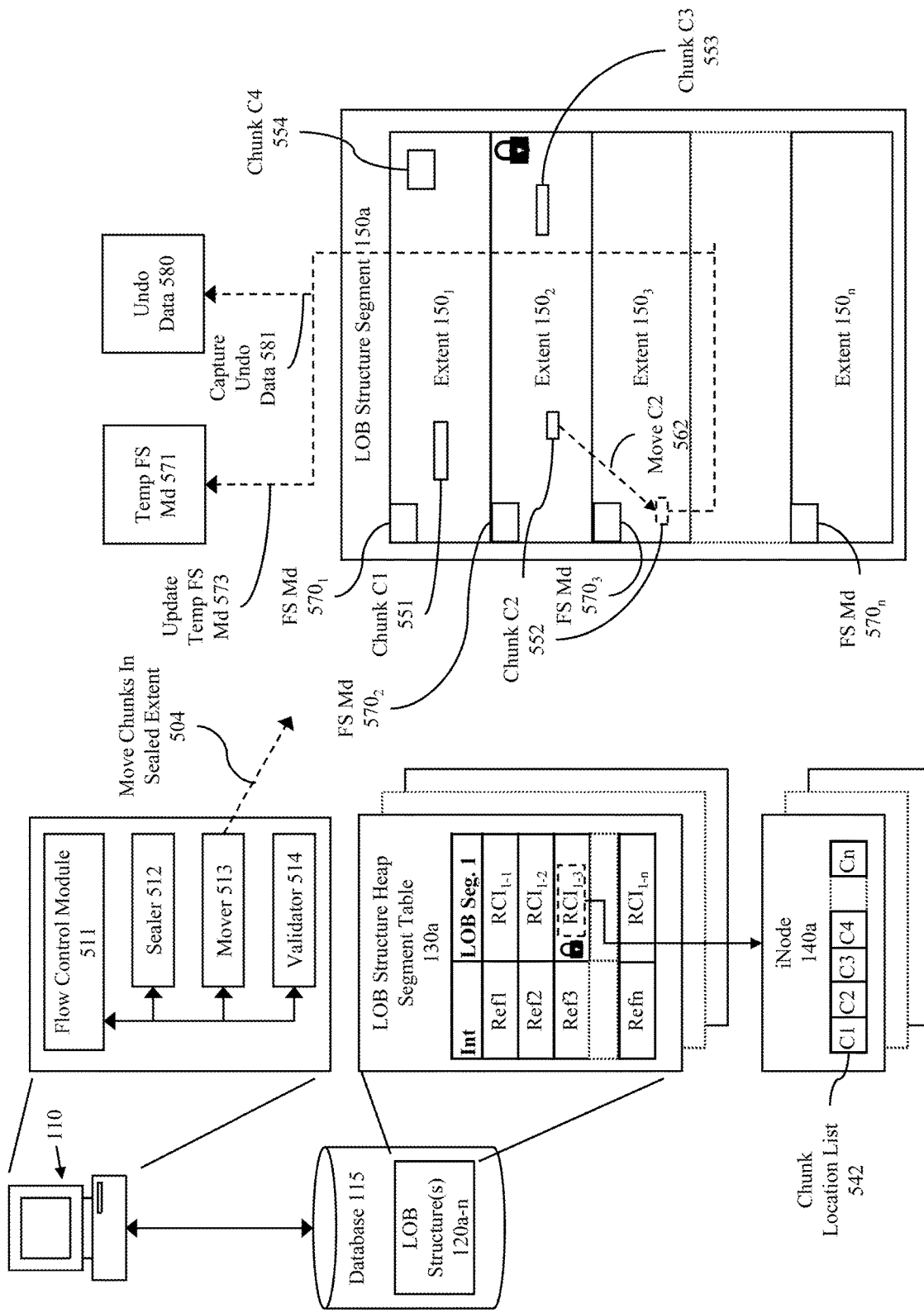
Figure 5F:
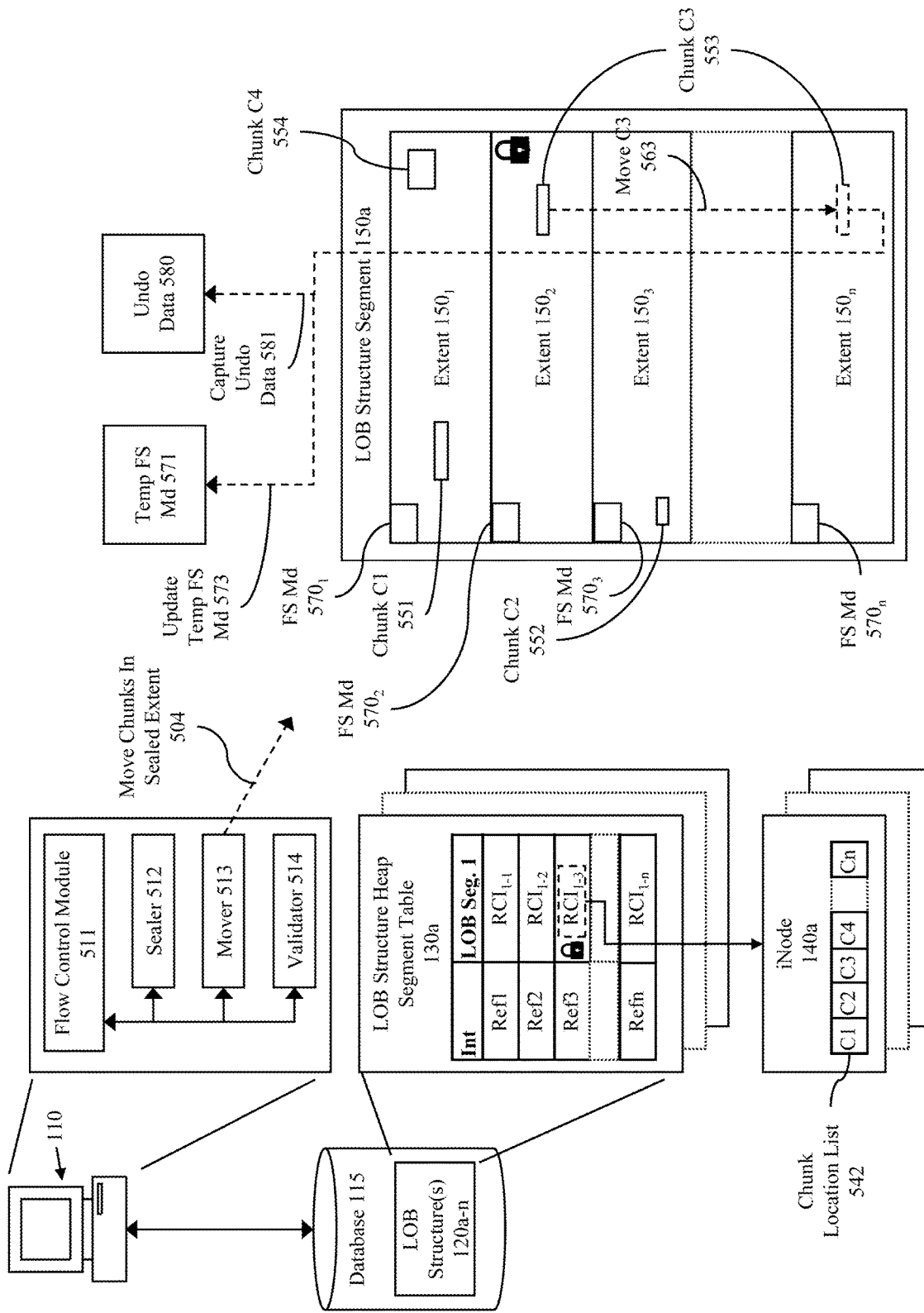

FIG. 5D illustrates the moving of chunk C1 from the selected extent to a different extent within the LOB segment structure. In some embodiments, the chunks could instead be moved to a different LOB structure or a different LOB structure segment in the same LOB.

As illustrated, the flow control module 511 triggers the movement of Chunk C1 551 via the mover 513 which causes the necessary operations to relocate the chunk at 504. For example, available space is identified in a different extent that is sufficient for storing the chunk C1. The chunk C1 is then moved (at 561) to that extent (here 1501). Additionally, the temporary metadata 571 is updated at 573 to reflect that the chunk C1 has been relocated by indicating that the previous location is now free space. Additionally, undo data 580 is captured that specifies the previous/original location of the chunk C1 before it was moved at 581.

Similarly, the other chunks in the sealed extent are then moved to different locations as well while updating the free space metadata 571 and capturing the necessary undo data at into undo data 580. This is illustrated for chunks C2 and C3 in FIGS. 5E and 5F, respectively.

In some embodiments, the traversal of the Heap segment table will require the processing of multiple cells at different RCIs to determine whether they correspond the currently selected extent. This could be achieved in multiple manners depending on how the heap table is arranged. For example, the heap table entries could be sorted based on the addresses that they reference, and all entries could be identified based on a determination that both the addresses below and above the extent have been identified. In some embodiments, the temporary free space metadata 571 could be analyzed to verify that all the space in the extent has been accounted for and used to stop a traversal. In some embodiments, a traversal could be executed for the entire heap segment table to ensure that no chunks have been missed.

Once this process has completed a validation process is triggered and executes as illustrated below for FIGS. 6A-6B2.

Figure 6A:
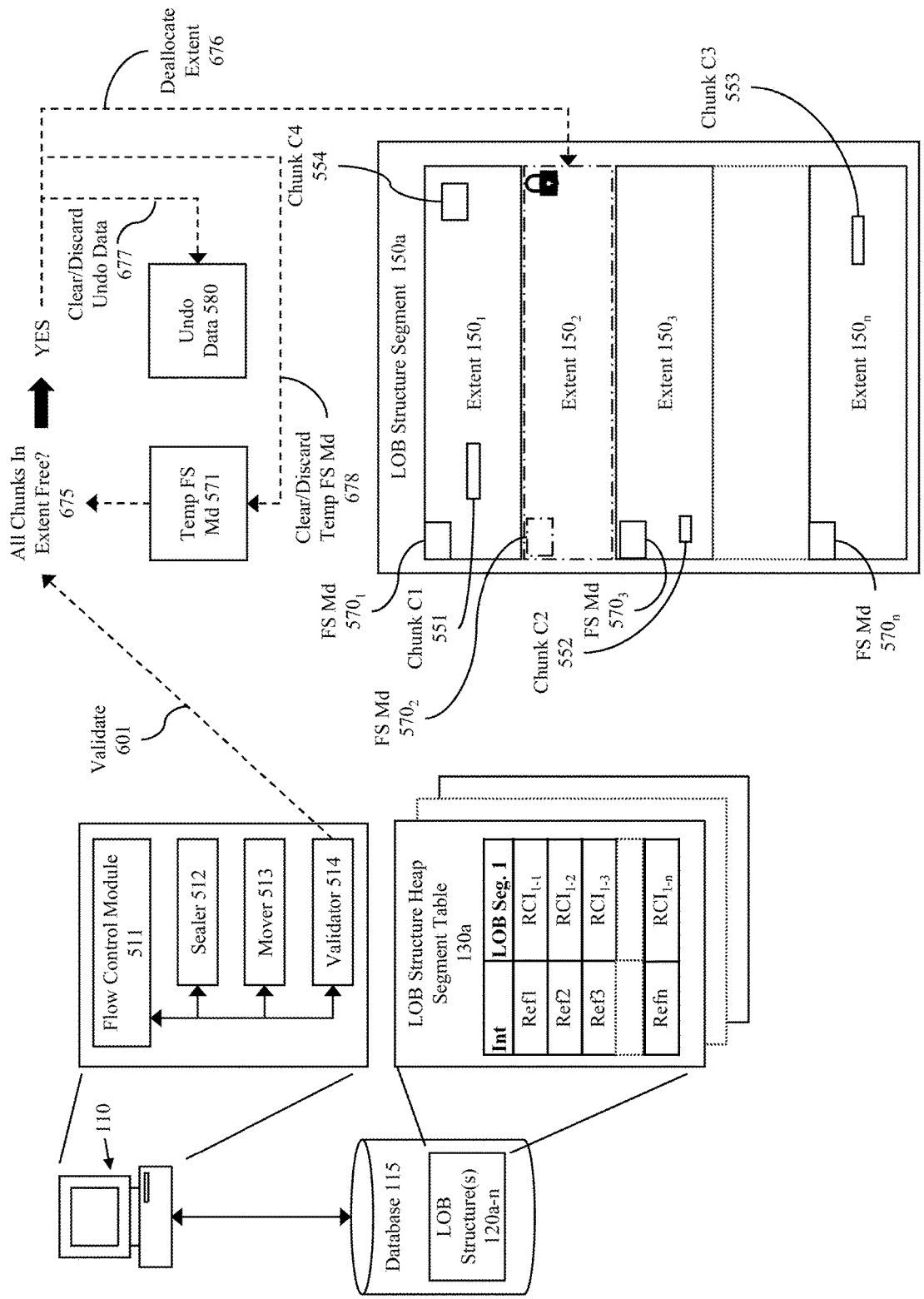

FIGS. 6A-6B2 illustrate an example flow for the titled validate or fail gracefully at 208 of FIG. 2 according to some embodiments. FIG. 6A illustrates a scenario where it is determined that all chunks have been freed successfully. FIG. 6B1-2 illustrates the opposite scenario where it is determined that not all chunks have been freed successfully.

In FIG. 6A, operations are performed in response to a determination that all chunks have been moved out of the selected extent.

The process may start when the LOB manager 510 triggers the validator 514 to validate whether the selected extent has been cleared of chunks at 601. This can be accomplished by comparing the temporary free space metadata to the size of the extent (see 675). For example, the temporary free space metadata is processed to combine contiguous free space portions. The free space metadata is then analyzed to determine if there are multiple free space portions. If there are multiple free space portions, then there is a gap in the free space and thus the extent has not been cleared and the process must be aborted (or an attempt could be made to move the remaining chunks) as discussed in FIGS. 6B1-6B2. If there is only a single contiguous free space, then the size of the free space is compared to the size of the extent. If the two sizes are equal then the extent has been freed, whereas if they are not equal then the extent has not been cleared and the process must be aborted as discussed in FIGS. 6B1-6B2.

If it has been determined that all chunks in the extent have been freed at 675, then one or more operations may be executed in response. The operations may comprise deallocating the extent at 676, clearing/discarding the temporary free space metadata 678, and/or clearing/discarding the undo data 677. This will free the extent from the LOB segment. Additionally, any updates to the heap segment table(s) and iNodes are executed as well.

In FIG. 6B1, operations are performed in response to a determination that all chunks have not been moved out of the selected extent. Generally, the process is similar to that of FIG. 6A, but instead of determining at 675 that all chunks in the extent are free, it is determined that all chunks are not free. Normally, if the process failed, then this is because a device did not receive and/or did not honor the sealing of that extent and wrote data into that extent.

The process starts at 682 to move the chunks back to their previous location. In some embodiments, the data was never removed from their previous locations. Instead, the chunks are copied and the deallocation upon successful validation would have cleared that space simply by marking it as free. In some embodiments, the data was removed from the extent and is relocated back into the extent.

In some embodiments, the free space metadata of the selected extent is coalesced at 674. In particular, the free space metadata is processed to combine free space entries for contiguous storage space into a single entry. Here, the metadata in the extent is operated upon, and not the temporary metadata 571. This is because the temporary free space metadata 571 would not account for any newly allocated data. In some embodiments, the functional relationship between the temporary metadata and the metadata in the extent is switched, such that the metadata in the extent is processed and the temporary metadata is available for restoration of a previous state for the chunks that were moved out of the extent. In such an embodiment, coalescing the free space can be executed in the validation step and then used for the ongoing representation.

Regardless of the mechanism, the undo data 580 can be used to trigger the movement/restoration of the chunks to their previous location at 661, 662, and 663. FIG. 6B2 illustrates the state of the extent after restoration. Specifically, it illustrates the state of the chunks that have been relocated/restored at their previous locations in the selected extent. After this, the seals and lock can be removed (see at least 691 and $RCI_{1-3}$), the temporary free space metadata 571 can be cleared/discarded at 678, and the process can continue or end as appropriate.

System Architecture

Figure 7:
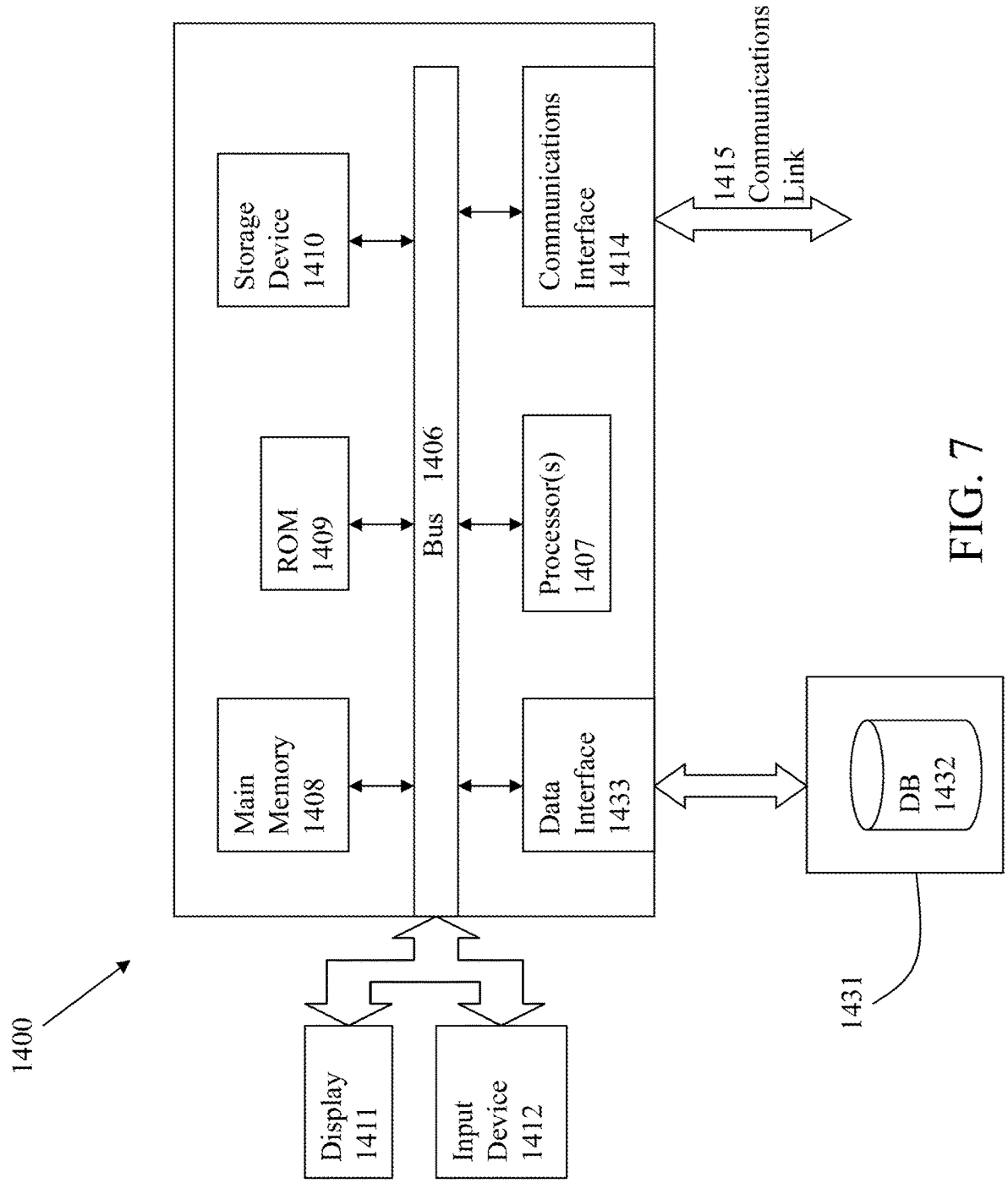
FIG. 7 is a diagram of a computing system suitable for implementing an embodiment of the present disclosure.

FIG. 7 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, cloud-based storage, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution. Data may be accessed from a database 1432 that is maintained in a storage device 1431, which is accessed using data interface 1433.

Figure 8:
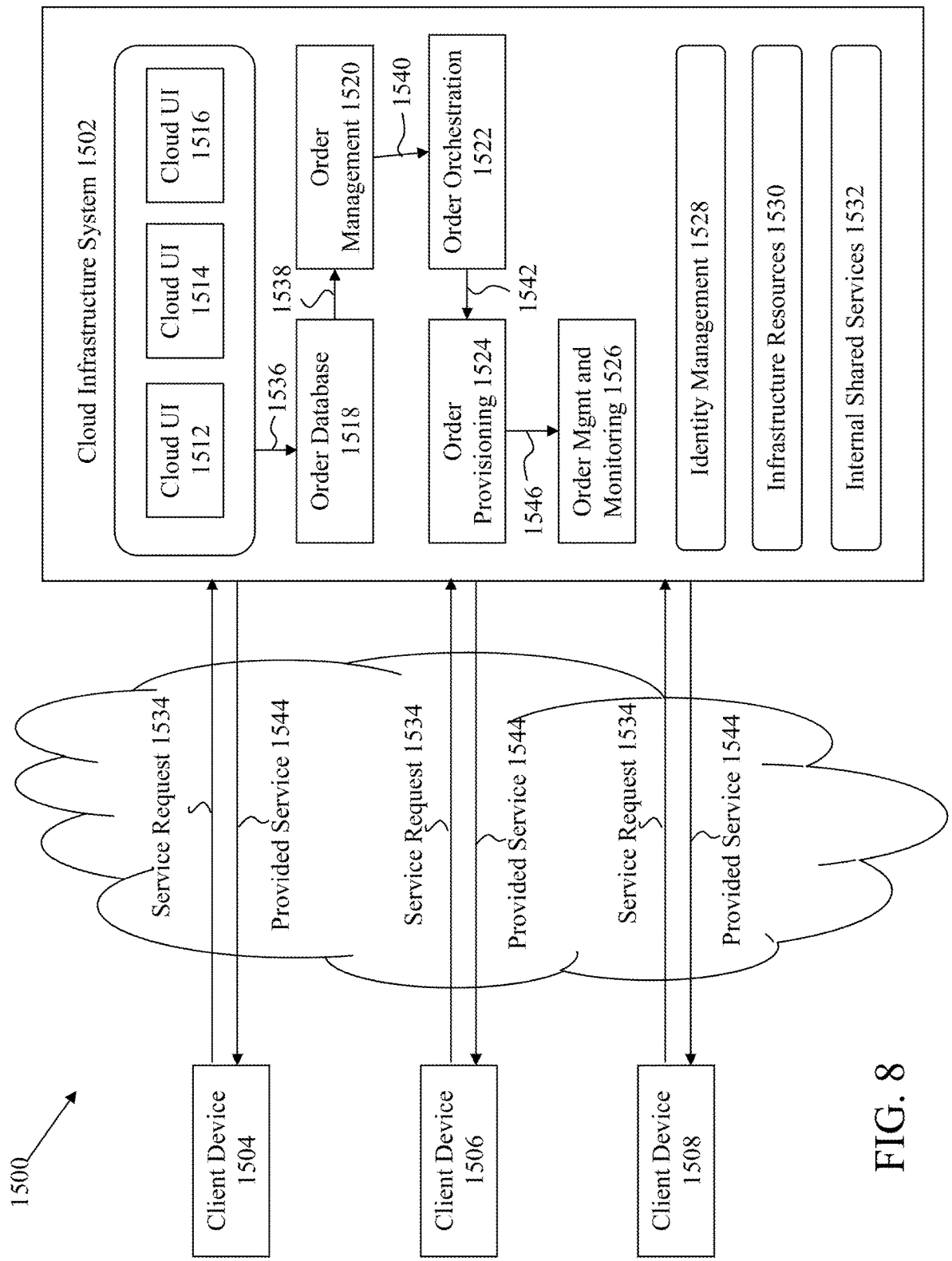
FIG. 8 is a block diagram of one or more components of a system environment in which services may be offered as cloud services, in accordance with an embodiment of the present invention.

FIG. 8 is a simplified block diagram of one or more components of a system environment 1500 by which services provided by one or more components of an embodiment system may be offered as cloud services, in accordance with an embodiment of the present disclosure. In the illustrated embodiment, system environment 1500 includes one or more client computing devices 1504, 1506, and 1508 that may be used by users to interact with a cloud infrastructure system 150₂ that provides cloud services. The client computing devices may be configured to operate a client application such as a web browser, a proprietary client application, or some other application, which may be used by a user of the client computing device to interact with cloud infrastructure system 1502 to use services provided by cloud infrastructure system 1502.

It should be appreciated that cloud infrastructure system 1502 depicted in the figure may have other components than those depicted. Further, the embodiment shown in the figure is only one example of a cloud infrastructure system that may incorporate an embodiment of the invention. In some other embodiments, cloud infrastructure system 1502 may have more or fewer components than shown in the figure, may combine two or more components, or may have a different configuration or arrangement of components.

Client computing devices 1504, 1506, and 1508 may be devices similar to those described above for FIG. 7. Although system environment 1500 is shown with three client computing devices, any number of client computing devices may be supported. Other devices such as devices with sensors, etc. may interact with cloud infrastructure system 1502.

Network(s) 1510 may facilitate communications and exchange of data between clients 1504, 1506, and 1508 and cloud infrastructure system 1502. Each network may be any type of network familiar to those skilled in the art that can support data communications using any of a variety of commercially available protocols. Cloud infrastructure system 1502 may comprise one or more computers and/or servers.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1502 may include a suite of applications, middleware, and database service offerings that are delivered to a customer in a self-service, subscription-based, elastically scalable, reliable, highly available, and secure manner.

In various embodiments, cloud infrastructure system 1502 may be adapted to automatically provision, manage and track a customer's subscription to services offered by cloud infrastructure system 1502. Cloud infrastructure system 1502 may provide the cloud services via different deployment models. For example, services may be provided under a public cloud model in which cloud infrastructure system 1502 is owned by an organization selling cloud services and the services are made available to the general public or different industry enterprises. As another example, services may be provided under a private cloud model in which cloud infrastructure system 1502 is operated solely for a single organization and may provide services for one or more entities within the organization. The cloud services may also be provided under a community cloud model in which cloud infrastructure system 1502 and the services provided by cloud infrastructure system 1502 are shared by several organizations in a related community. The cloud services may also be provided under a hybrid cloud model, which is a combination of two or more different models.

In some embodiments, the services provided by cloud infrastructure system 1502 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1502. Cloud infrastructure system 1502 then performs processing to provide the services in the customer's subscription order.

In some embodiments, the services provided by cloud infrastructure system 1502 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services, and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1502 may also include infrastructure resources 1530 for providing the resources used to provide various services to customers of the cloud infrastructure system. In one embodiment, infrastructure resources 1530 may include pre-integrated and optimized combinations of hardware, such as servers, storage, and networking resources to execute the services provided by the PaaS platform and the SaaS platform.

In some embodiments, resources in cloud infrastructure system 1502 may be shared by multiple users and dynamically re-allocated per demand. Additionally, resources may be allocated to users in different time zones. For example, cloud infrastructure system 1530 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1532 may be provided that are shared by different components or modules of cloud infrastructure system 1502 and by the services provided by cloud infrastructure system 1502. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1502 may provide comprehensive management of cloud services (e.g., SaaS, PaaS, and IaaS services) in the cloud infrastructure system. In one embodiment, cloud management functionality may include capabilities for provisioning, managing, and tracking a customer's subscription received by cloud infrastructure system 1502, and the like.

In one embodiment, as depicted in the figure, cloud management functionality may be provided by one or more modules, such as an order management module 1520, an order orchestration module 1522, an order provisioning module 1524, an order management and monitoring module 1526, and an identity management module 1528. These modules may include or be provided using one or more computers and/or servers, which may be general purpose computers, specialized server computers, server farms, server clusters, or any other appropriate arrangement and/or combination.

In operation 1534, a customer using a client device, such as client device 1504, 1506 or 1508, may interact with cloud infrastructure system 1502 by requesting one or more services provided by cloud infrastructure system 1502 and placing an order for a subscription for one or more services offered by cloud infrastructure system 1502. In certain embodiments, the customer may access a cloud User Interface (UI), cloud UI 1512, cloud UI 1514 and/or cloud UI 1516 and place a subscription order via these UIs. The order information received by cloud infrastructure system 1502 in response to the customer placing an order may include information identifying the customer and one or more services offered by the cloud infrastructure system 1502 that the customer intends to subscribe to.

After an order has been placed by the customer, the order information is received via the cloud UIs, 1512, 1514 and/or 1516. At operation 1536, the order is stored in order database 1518. Order database 1518 can be one of several databases operated by cloud infrastructure system 1518 and operated in conjunction with other system elements. At operation 1538, the order information is forwarded to an order management module 1520. In some instances, order management module 1520 may be configured to perform billing and accounting functions related to the order, such as verifying the order, and upon verification, booking the order. At operation 1540, information regarding the order is communicated to an order orchestration module 1522. Order orchestration module 1522 may utilize the order information to orchestrate the provisioning of services and resources for the order placed by the customer. In some instances, order orchestration module 1522 may orchestrate the provisioning of resources to support the subscribed services using the services of order provisioning module 1524.

In certain embodiments, order orchestration module 1522 enables the management of business processes associated with each order and applies business logic to determine whether an order should proceed to provisioning. At operation 1542, upon receiving an order for a new subscription, order orchestration module 1522 sends a request to order provisioning module 1524 to allocate resources and configure those resources needed to fulfill the subscription order. Order provisioning module 1524 enables the allocation of resources for the services ordered by the customer. Order provisioning module 1524 provides a level of abstraction between the cloud services provided by cloud infrastructure system 1502 and the physical implementation layer that is used to provision the resources for providing the requested services. Order orchestration module 1522 may thus be isolated from implementation details, such as whether or not services and resources are actually provisioned on the fly or pre-provisioned and only allocated/assigned upon request.

At operation 1544, once the services and resources are provisioned, a notification of the provided service may be sent to customers on client devices 1504, 1506 and/or 1508 by order provisioning module 1524 of cloud infrastructure system 1502.

At operation 1546, the customer's subscription order may be managed and tracked by an order management and monitoring module 1526. In some instances, order management and monitoring module 1526 may be configured to collect usage statistics for the services in the subscription order, such as the amount of storage used, the amount data transferred, the number of users, and the amount of system up time and system down time.

In certain embodiments, cloud infrastructure system 1502 may include an identity management module 1528. Identity management module 1528 may be configured to provide identity services, such as access management and authorization services in cloud infrastructure system 1502. In some embodiments, identity management module 1528 may control information about customers who wish to utilize the services provided by cloud infrastructure system 1502. Such information can include information that authenticates the identities of such customers and information that describes which actions those customers are authorized to perform relative to various system resources (e.g., files, directories, applications, communication ports, memory segments, etc.) Identity management module 1528 may also include the management of descriptive information about each customer and about how and by whom that descriptive information can be accessed and modified.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are, accordingly, to be regarded in an illustrative rather than restrictive sense.

Additionally, the approach disclosed herein for management of a large object (LOB) addresses some of the issues of prior techniques suffer from, such as the lack of accessibility of the LOB during management operations, the large requirement to allocate duplicate storage space for the LOB, and the amount of time that any particular portion of the LOB is not accessible. Therefore, there is a need for an improved approach to manage LOB s that does not suffer from the same drawbacks as prior approaches.

What is claimed:

1. A computer-implemented method comprising:
identifying a large object (LOB) structure to be shrunk;
identifying at least a smaller portion of the LOB structure to be shrunk; and
executing a shrink operation on an extent in the smaller portion of the LOB structure without blocking access to one or more other extents of the LOB structure at least by:
while allowing the plurality of requestors to access the one or more other extents, performing a sealing operation on the extent at least by sending an instruction to a plurality of requestors to prevent modification of data in the extent by the plurality of requestors, wherein the sealing operation comprises informing one or more devices accessing the LOB structure not to allocate contiguous storage space within the extent for one or more new chunks or not to modify existing data in the contiguous storage space, without waiting for acknowledgements from the one or more computing devices;
after informing the one or more devices and during execution of a number of shrink operations on the one or more extents including the extent, determining whether there exists modified existing data or a new chunk for which at least a part of the contiguous storage space is allocated in the extent;
after performing the sealing operation on the extent, moving one or more chunks within the extent to one or more other extents of the LOB structure, wherein the extent represents the contiguous storage space that is allocated for storing at least the large object (LOB) or a portion thereof; and
determining whether the extent is able to be removed from the smaller portion of the LOB structure at least by analyzing the contiguous storage space in the extent, based at least in part upon success or failure of requesting the plurality of requestors not to access the extent.

2. The method of claim 1, wherein the extent is selected from a plurality of extents in the smaller portion of the LOB structure, and the method further comprises:
identifying one or more extents from the plurality of extents in the smaller portion based at least in part on data pertaining to free space in the one or more extents that comprise the extent; and
executing a number of shrink operations on the one or more extents based at least in part upon a prior successful shrink operation or a prior unsuccessful shrink operation, without blocking read access to the one or more extents.

3. The method of claim 1, analyzing the contiguous space comprising:
determining whether no chunks of the extent include data from one or more requestors of the plurality of requestors or whether all chunks of the extent are free for deallocation to generate a determination result; and
when the determination result is negative, maintaining existing data in one or more chunks of the extent without clearing the existing data from the one or more chunks, wherein
executing the shrink operation on the extent does not block read operations on the extent, and
the success or failure of requesting the plurality of requestors not to access the extent comprising the success or failure of copying the existing data in one or more chunks of the extent to the one or more other extents.

4. The method of claim 1, further comprising:
transferring at least some of the existing data from the extent to a different extent that comprises separate contiguous storage space that is to be allocated for storing the at least some of the existing data; and
deallocating the extent after all of the existing data is moved out of the extent.

5. The method of claim 1, further comprising maintaining the modified existing data or the new chunk in the extent, without moving the modified existing data or the new chunk to the different extent.

6. The method of claim 1, further comprising at least one of:
sealing the extent at least further by stopping one or more computing systems from storing new data within the extent or modifying the data already in the extent;
coalescing free space metadata in a selected extent, wherein a determination of whether the extent can be removed is based at least in part on an analysis of free space metadata; or
undoing the shrink operation executed on the extent in the smaller portion of the LOB structure in response to a determination that at least one chunk remains in the extent.

7. The method of claim 1, further comprising processing a failed shrink operation on the extent without undoing one or more chunk moves, wherein executing the shrink operation on the extent does not block read operations on the extent.

8. A non-transitory computer readable medium having stored thereon a sequence of instructions which, when executed by a processor, causes the process to perform a set of acts, the set of acts comprising:

identifying a large object (LOB) structure to be shrunk;
identifying at least a smaller portion of the LOB structure to be shrunk;
executing a shrink operation on an extent in the smaller portion of the LOB structure without blocking access to one or more other extents of the LOB structure at least by:
while allowing the plurality of requestors to access the one or more other extents, performing a sealing operation on the extent at least by sending an instruction to request a plurality of requestors to prevent the plurality of requestors from modifying the extent;
after performing the sealing operation on the extent, moving one or more chunks within the extent to one or more other extents of the LOB structure, wherein the extent represents contiguous storage space that is allocated for storing at least a large object (LOB) or a portion thereof;
processing a failed shrink operation on the extent without undoing one or more chunk moves, wherein executing the shrink operation on the extent does not block read operations on the extent; and
determining whether the extent is able to be removed from the portion of the LOB structure at least by analyzing the contiguous space in the extent, based at least in part upon success or failure of requesting the plurality of requestors not to access the extent.

9. The non-transitory computer readable medium of claim 8, wherein the extent is selected from a plurality of extents in the smaller portion of the LOB structure, and the method further comprises:
identifying one or more extents from the plurality of extents in the smaller portion based at least in part on the data pertaining to free space in the one or more extents that comprise the extent; and
executing a number of shrink operations on the one or more extents based at least in part upon a prior successful shrink operation or a prior unsuccessful shrink operation, without blocking read access to the one or more extents.

10. The non-transitory computer readable medium of claim 8, wherein the set of acts comprising analyzing the contiguous space further comprises:
determining whether no chunks of the extent include data from one or more requestors of the plurality of requestors or whether all chunks of the extent are free for deallocation to generate a determination result; and
when the determination result is negative, maintaining existing data in one or more chunks of the extent without clearing the existing data from the one or more chunks, wherein
executing the shrink operation on the extent does not block read operations on the extent, and
the success or failure of requesting the plurality of requestors not to access the extent comprising the success or failure of copying the existing data in one or more chunks of the extent to the one or more other extents.

11. The non-transitory computer readable medium of claim 8, wherein the set of acts further comprises sealing the extent that has been selected, wherein sealing the extent comprises:
informing one or more devices accessing the LOB structure not to allocate the contiguous storage space within the extent for one or more new chunks or not to modify existing data in the contiguous storage space, without waiting for acknowledgements from the one or more computing devices; and after informing the one or more computing devices and during execution of a number of shrink operations on the one or more extents including the extent, determining whether there exists modified existing data or a new chunk for which at least a part of the contiguous storage space is allocated in the extent exists.

12. The non-transitory computer readable medium of claim 11, wherein the set of acts further comprises:
transferring at least some of the existing data from the extent to a different extent that comprises separate contiguous storage space that is to be allocated for storing the at least some of the existing data; and
deallocating the extent after all of the existing data is moved out of the extent.

13. The non-transitory computer readable medium of claim 11, the set of acts further comprising maintaining the modified existing data or the new chunk in the extent, without moving the modified existing data or the new chunk to the different extent.

14. The non-transitory computer readable medium of claim 8, wherein the set of acts further comprises at least one of:
sealing the extent at least further by stopping one or more computing systems from storing new data within the extent or modifying the data already in the extent;
coalescing free space metadata in a selected extent, wherein a determination of whether the extent can be removed is based at least in part on analysis of free space metadata; or
undoing the shrink operation executed on the extent in the smaller portion of the LOB structure in response to a determination that at least one chunk remains in the extent.

15. A computing system comprising:
a memory to hold a set of instructions;
a computer processor to execute the set of instructions, which when executed, causes the computer processor to perform a set of acts, the set of acts comprising:
identifying a large object (LOB) structure to be shrunk;
identifying at least a smaller portion of the LOB structure to be shrunk;
executing a shrink operation on an extent in the smaller portion of the LOB structure without blocking access to one or more other extents of the LOB structure at least by:
while allowing the plurality of requestors to access the one or more other extents, performing a sealing operation on the extent at least by sending an instruction to request a plurality of requestors to prevent the plurality of requestors from modifying the extent, wherein the sealing operation comprises informing one or more devices accessing the LOB structure not to allocate contiguous storage space within the extent for one or more new chunks or not to modify existing data in the contiguous storage space, without waiting for acknowledgements from the one or more computing devices;
after informing the one or more devices and during execution of a number of shrink operations on the one or more extents including the extent, determining whether there exists modified existing data or a new chunk for which at least a part of the contiguous storage space is allocated in the extent;
after performing the sealing operation on the extent, moving one or more chunks within the extent to one or more other extents of the LOB structure, wherein the extent represents the contiguous storage space that is allocated for storing at least the large object (LOB) or a portion thereof; and
determining whether the extent can be removed from the portion of the LOB structure at least by analyzing the contiguous space in the extent, based at least in part upon success or failure of requesting the plurality of requestors not to access the extent.

16. The computing system of claim 15, wherein the extent is selected from a plurality of extents in the smaller portion of the LOB structure, and the set of acts further comprises:
identifying one or more extents from the plurality of extents in the smaller portion based at least in part on the data pertaining to free space in the one or more extents that comprise the extent; and
executing a number of shrink operations on the one or more extents based at least in part upon a prior successful shrink operation or a prior unsuccessful shrink operation, without blocking read access to the one or more extents.

17. The computing system of claim 15, wherein the set of acts comprising analyzing the contiguous space further comprises:
determining whether no chunks of the extent include data from one or more requestors of the plurality of requestors or whether all chunks of the extent are free for deallocation to generate a determination result; and
when the determination result is negative, maintaining existing data in one or more chunks of the extent without clearing the existing data from the one or more chunks, wherein
executing the shrink operation on the extent does not block read operations on the extent, and
the success or failure of requesting the plurality of requestors not to access the extent comprising the success or failure of copying the existing data in one or more chunks of the extent to the one or more other extents.

18. The computing system of claim 15, the set of acts further comprising:
transferring at least some of the existing data from the extent to a different extent that comprises separate contiguous storage space that is to be allocated for storing the at least some of the existing data; and
deallocating the extent after all of the existing data is moved out of the extent.

19. The computing system of claim 15, wherein the set of acts further comprises maintaining the modified existing data or the new chunk in the extent, without moving the modified existing data or the new chunk to the different extent.

20. The computing system of claim 15, wherein the set of acts further comprises at least one of:
sealing the extent at least further by stopping one or more computing systems from storing new data within the extent or modifying the data already in the extent;
coalescing free space metadata in a selected extent, wherein a determination of whether the extent can be removed is based at least in part on analysis of free space metadata; or
undoing the shrink operation executed on the extent in the smaller portion of the LOB structure in response to a determination that at least one chunk remains in the extent.

21. The computing system of claim 15, wherein the set of acts further comprises processing a failed shrink operation on the extent without undoing one or more chunk moves, wherein executing the shrink operation on the extent does not block read operations on the extent.

* * * * *